July 31, 1962 K. A. ROBINSON 3,047,792
AUTOMATIC ELECTRIC CURRENT REGULATORS
Filed April 28, 1959
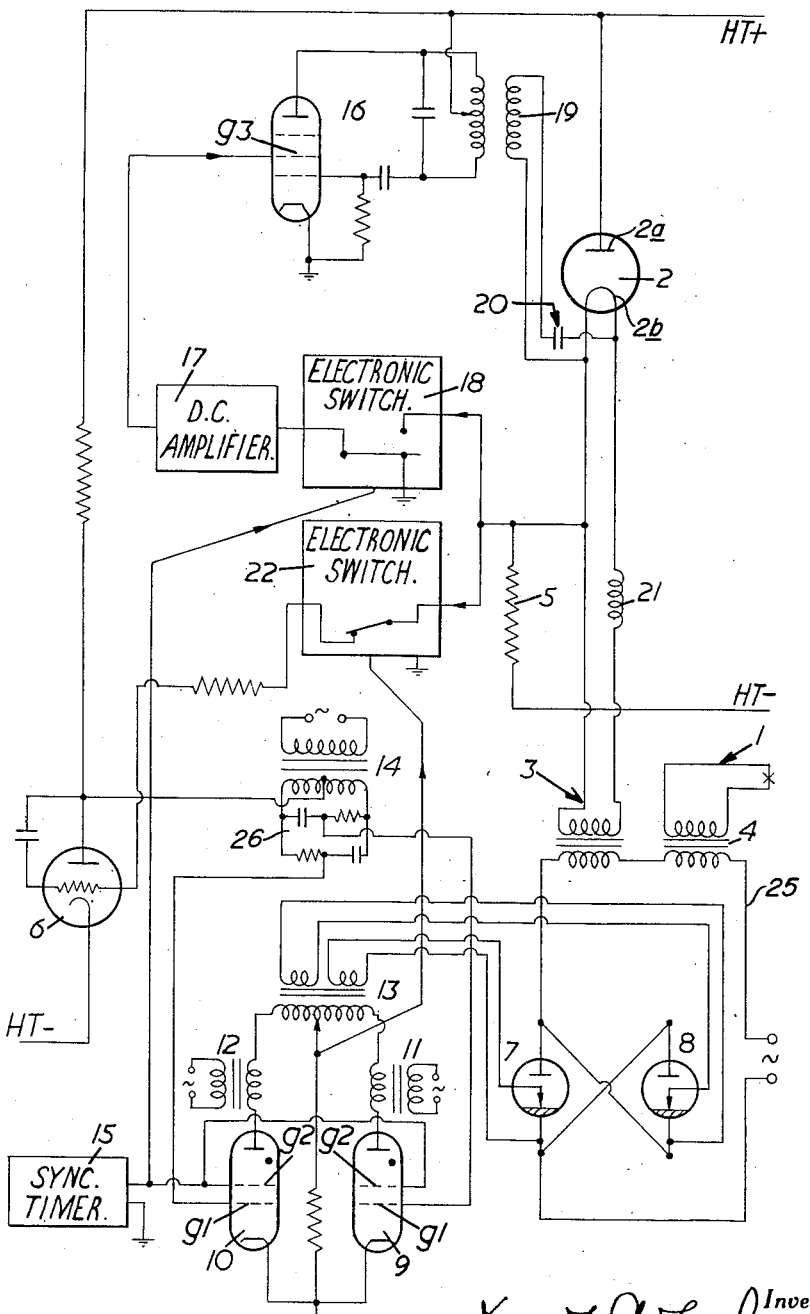

United States Patent Office 3,047,792
Patented July 31, 1962

3,047,792
AUTOMATIC ELECTRIC CURRENT REGULATORS
Kenneth Arthur Robinson, Etchinghill, near Rugeley, England, assignor to Lancashire Dynamo Electronic Products Limited, Rugeley, England, a British company
Filed Apr. 28, 1959, Ser. No. 809,559
Claims priority, application Great Britain Apr. 30, 1958
4 Claims. (Cl. 323—18)

This invention relates to automatic control systems for controlling the strength of an intermittent alternating current supply such as is required for resistance welding machines.

It is a requirement of such machines that the heating effect of the welding current should be kept at the same constant level during all the periods when the welding current is switched on. To achieve this a control system is provided in which the R.M.S. value of the welding current is measured by passing the welding current, or a current derived therefrom, through the cathode heating circuit of a thermionic valve so as to heat the cathode to a temperature which depends upon the R.M.S. value of the current. The valve is thereby rendered conductive so that it conducts space current to an extent which depends upon the temperature of the cathode. Since the temperature of the cathode is dependent upon the R.M.S. value of the cathode heating current a control signal is obtained which is entirely suitable for regulating the controlling action of an automatic control system designed to maintain the welding current at a predetermined level.

A difficulty which arises in the operation of this control system is caused by the fact that the heat is not continuously applied but is interrupted by "cool" periods or periods of rest which alternate with working periods during which the current is switched on. To enable the system to control correctly during operating periods separated by periods of rest it is necessary to provide some means for preheating the cathode so as to bring it up to working temperature at the beginning of each working period. Otherwise an excessive current would flow during the time required to bring the cathode up to working temperature from cold at the beginning of each working period. The use of an auxiliary alternating current to effect this preheating requires rather complicated switching arrangements.

According to the present invention, provision is made for preheating the cathode prior to each working period from a current supply of higher frequency than that of the working current such that interference between the working current and the preheating current can be prevented by reactance elements or simple filters. This enables the switching arrangements to be materially simplified.

It is thus an object of the present invention to provide an automatic control system for controlling the strength of an intermittent alternating current supply, in which a thermionic valve having a variably heated cathode is used for measuring the current supply to be controlled and in which an auxiliary heating current is used for heating the cathode during periods when the alternating current is switched off.

Another object of the invention is to provide a system in which a high frequency current supply is used for heating the cathode of a thermionic valve during periods when an alternating current supply is switched off, thereby preheating the cathode in preparation for the periods when the heating effect of the alternating current supply fed to the cathode heating circuit is used to regulate the strength of the alternating current.

The accompanying drawing is a schematic diagram of one example of an arrangement according to the invention for controlling the current supply to a resistance welding machine which operates during relatively short "on" periods in which actual welding occurs separated by "off" periods during which the weld is allowed to cool.

The accompanying drawing is a schematic diagram of one example of an arrangement according to the invention.

In the drawing the reference numerals indicate a resistance welding machine to which current is supplied under the control of a thermionic valve 2 in the form of a diode having an anode 2a and a filamentary cathode 2b which constitutes its own cathode heating circuit. The filamentary cathode 2a is supplied with heating current through a current transformer 3 having its primary winding connected in a welding current supply circuit 25 in series with the primary winding of the welding transformer 4. The diode is so operated that its space current varies in accordance with the temperature of the cathode and thus provides a measure of the R.M.S. value of the welding current under steady working conditions. A signal voltage representing the R.M.S. value of the welding current is obtained as a voltage drop through a load resistance 5 arranged to carry the diode current. This signal voltage is fed through a storage amplifier 6 to a welding current regulator of the type in which the welding current in a supply circuit 25 is regulated by controlling the phase angle of firing of two ignitrons 7 and 8 during alternate half-cycles of the alternating current supply. The ignitrons are controlled by auxiliary thyratrons 9 and 10 which have their anode circuits energised in phase opposition by means of two transformers 11 and 12 and are coupled to the ignitrons by a transformer 13 arranged so that the ignitron 7 is started by a current impulse from the right hand output of the transformer when the thyratron 9 fires and the ignitron 8 is started by a current impulse from the left hand output of the transformer when the thyratron 10 fires. The thyratrons have control grids $g1$ energised through suitable phase-shifting networks 26 from a centre-tapped transformer 14 arranged so that the D.C. output of the storage amplifier is superposed on alternating voltages applied to the grids $g1$ of the thyratrons and lagging 90° behind the voltage applied to the anodes thereof. The thyratrons are thus arranged to control the welding current by controlling the phase angle of firing of the ignitrons 7 and 8 in dependence upon the direct-current voltage at the anode of the storage amplifier 6, the phase angle being advanced so as to increase the weld current when the output voltage of the storage amplifier increases and retarded so as to reduce the welding current when the output voltage of the storage amplifier falls. This controlling action is dependent upon the voltage drop through the load resistance 5 in the opposite sense so that the welding current is automatically controlled at a level which can be preset by suitable choice of the value of the resistance 5 having regard to the thermionic emission characteristic of the diode 2 and the voltage levels at the points HT+ and HT−.

The thyratrons 9 and 10 have additional grids $g2$ connected to a timing device 15 which is arranged to apply a negative bias to the grids $g2$ so as to switch off the thyratrons during the "off" periods of the welding machine and to apply a positive bias to the grids $g2$ so as to render the thyratrons operative during the "on" periods of the welding machine. The welding current is thus switched on and off under the control of the timing device as ordinarily required.

In order to preheat the filament of the diode 2 during the "off" periods of the welding machine, a radio-frequency valve oscillator 16 having an auxiliary control grid g3 by which the amplitude of the oscillations generated can be regulated is arranged to supply heating current to the diode filament during the "off" periods of the welding machine. The auxiliary control grid g3 receives its control voltage from a direct-current amplifier 17 which receives its input from the load resistance 5 during preheating periods through an electronic switch 18 controlled by the timing device 15. The switch 18 is arranged to disconnect the input of the amplifier 17 from the load resistance 5 during welding periods and to connect it instead to a point of constant potential so chosen as to suppress the oscillations generated by the oscillator 16. The oscillator is coupled to the filament of the diode 2 by a radio frequency transformer having a secondary winding 19 connected across the diode filament through a series condenser 20 which isolates the oscillator from the low frequency current fed to the diode filament by the current transformer. The secondary winding of the transformer 3 is connected to the diode filament through a high frequency choke 21 which isolates the current transformer from the radio frequency circuit.

As there is a considerable ripple in the signal voltage obtained from the rectifier 2 at the frequencies ordinarily used, it is desirable for the storage amplifier 6 to receive samples of the voltage across the load resistance 5 by connecting the load resistance to the input of the amplifier momentarily at times when the welding current has just ceased and the full heating effect on the diode heater has been produced. This is achieved in the arrangement shown by means of an electronic switch 22 so controlled from the common anode circuit of the thyratrons 9 and 10 that it is momentarily closed each time the thyratron 9 or 10 is extinguished.

In the operation of the system, during the "on" periods controlled by the time device 15, the switch 18 is switched off and the grids g2 receive a positive bias which renders the thyratrons 9 and 10 operative as previously described. Output of the storage amplifier 6 therefore regulates the welding current by controlling the phase angle of firing of the igniters 7 and 8 so as to maintain nearly constant the voltage drop through the resistance 5 as represented by the samples thereof taken by the action of the switch 22 at times when the thyratrons 9 and 10 have just been extinguished. During this time, the oscillator 16 is inoperative because the switch 18 has connected the input of the amplifier 17 to a point of constant potential so chosen as to suppress the oscillations generated by the oscillator 16 as previously described.

During the "off" periods controlled by the timing device 15 the grids g1 and g2 receive a negative bias which renders the thyratrons 9 and 10 inoperative, thereby switching off the alternating current supply in the circuit 25. The switch 18 connects the input of the amplifier 17 to the load resistance 5 so that the oscillator 16 is brought into action and is controlled automatically so as to maintain the filament of the diode 2 at a required working temperature.

I claim:
1. In an automatic control system for controlling the strength of an intermittent alternating current supply, the combination of a thermionic valve having an anode, a cathode, an anode circuit and a cathode heating circuit; means for applying a voltage to the anode circuit of said valve to cause a ffow of space current in said valve upon heating of said cathode; means for supplying to said cathode heating circuit a heating current which is variable in dependence upon the strength of the current to be controlled within a range in which variations in the strength of the heating current cause variations in the space current of said valve, means for intermittently switching on said alternating current supply and regulating the current strength thereof when switch on in dependence upon the space current of said valve; a current supply of higher frequency than said alternating current supply, and means for switching on said current supply of higher frequency to preheat the cathode of said valve prior to switching on said alternating current supply.

2. In an automatic control system for controlling the strength of an intermittent alternating current supply, the combination of a thermionic valve having an anode circuit and a cathode heating circuit means for applying a voltage to the anode circuit of said thermionic valve; means dependent upon the heating of said cathode for regulating the strength of the alternating current to be controlled; means for switching said current supply on and off alternately; means for supplying a cathode heating current obtained from said current supply to said cathode heating circuit during periods when the current supply is switched on; an oscillation generator coupled to said cathode heating circuit for supplying high frequency heating current to said cathode heating circuit during periods when said alternating current supply is switched off; and means for suppressing the oscillations when the alternating current supply is switched on.

3. In an automatic control system for controlling the strength of an intermittent alternating current, the combination of an alternating current supply circuit; a thermionic valve having an anode circuit and a cathode heating circuit; means for supplying a voltage to the anode circuit of said valve to cause a flow of space current in said valve upon heating of said cathode means for supplying alternating current from said supply circuit to said cathode heating circuit for variably heating the cathode of said thermionic valve and thereby regulating the space current of said valve in dependence upon the strength of the current in said supply circuit; means for intermittently switching on said alternating current supply and regulating the strength thereof when switched on in dependence upon the space current of said valve; a high frequency oscillation generator coupled to said cathode heating circuit; means for energising said high frequency oscillator during periods when said current supply is switched off; and reactance elements in said cathode heating circuit for preventing interference between the supply circuit and the oscillation generator.

4. In an automatic control system for controlling the strength of an intermittent alternating current supply, the combination of an alternating current supply circuit; a thermionic valve having an anode circuit and a cathode heating circuit; means for supplying a voltage to the anode circuit of said valve to cause a flow of space current in said valve upon heating of said cathode; a high frequency oscillation generator; a high frequency transformer coupling said oscillation generator to said cathode heating circuit; a current transformer coupling said alternating current supply circuit to said cathode heating circuit; a series capacitance inserted in said cathode heating circuit for isolating said oscillator from the low frequency current fed to said cathode heating circuit by said current transformer; a high frequency choke inserted in said cathode heating circuit for isolating said current transformer from said oscillator; means for intermittently switching on said alternating current supply and regulating the strength thereof when switched on in dependence upon the space current of said valve; and means for energising said high frequency oscillator during periods when said current supply is switched off.

No references cited.